INVENTOR
GRAHAM C. DRISCOLL, JR.

BY [signature]

ATTORNEY

OVERALL FLOWCHART FOR CPU #s

Dec. 29, 1970 G. C. DRISCOLL, JR 3,551,892
INTERACTION IN A MULTI-PROCESSING SYSTEM UTILIZING CENTRAL TIMERS
Filed Jan. 15, 1969 8 Sheets-Sheet 6

EXECUTION OF A SEND MESSAGE INSTRUCTION
(BY CPU #s)

HANDLING OF ITS TIMER AFTER CLOCK PULSE BY CPU#m

FIG. 6

| ADDRESS | MEMORY CONTENT |
|---|---|
| BASE + 0 | LOCK FOR CPU #0 |
| BASE + 1 | TIMER FOR CPU #0 |
| BASE + 2 | ALTN. TIMER FOR CPU #0 |
| BASE + 3 | MESSAGE FOR CPU #0 |
| BASE + 4 × 1 + 0 | LOCK FOR CPU #1 |
| BASE + 4 × 1 + 1 | TIMER FOR CPU #1 |
| BASE + 4 × 1 + 2 | ALTN. TIMER FOR CPU #1 |
| BASE + 4 × 1 + 3 | MESSAGE FOR CPU #1 |
| BASE + 4 × 2 + 0 | LOCK FOR CPU #2 |
| BASE + 4 × 2 + 1 | TIMER FOR CPU #2 |
| BASE + 4 × 2 + 2 | ALTN. TIMER FOR CPU #2 |
| BASE + 4 × 2 + 3 | MESSAGE FOR CPU #2 |
| BASE + 4 × 3 + 0 | LOCK FOR CPU #3 |
| BASE + 4 × 3 + 1 | TIMER FOR CPU #3 |
| BASE + 4 × 3 + 2 | ALTN. TIMER FOR CPU #3 |
| BASE + 4 × 3 + 3 | MESSAGE FOR CPU #3 |
| | |
| BASE + 4 × n + 0 | LOCK FOR CPU #n |
| BASE + 4 × n + 1 | TIMER FOR CPU #n |
| BASE + 4 × n + 2 | ALTN. TIMER FOR CPU #n |
| BASE + 4 × n + 3 | MESSAGE FOR CPU #n |

United States Patent Office 3,551,892
Patented Dec. 29, 1970

3,551,892
INTERACTION IN A MULTI-PROCESSING SYSTEM UTILIZING CENTRAL TIMERS

Graham C. Driscoll, Jr., Yorktown Heights, N.Y., assignor to International Business Machines Corporation, Armonk, N.Y., a corporation of New York Filed Jan. 15, 1969, Ser. No. 791,258
Int. Cl. G06f 15/16
U.S. Cl. 340—172.5 14 Claims

ABSTRACT OF THE DISCLOSURE

In a multi-processor computer system including a plurality of individual processors and a central memory accessible to all processors, interaction control means for allowing all processors to communicate with each other over existing data busses. Means are provided in each processor for storing a message in central memory from a sending processor and further means are provided in each processor for recognizing that a message is present and for retrieving same. The system utilizes an expanded timer storage facility in central memory together with special hardware to accomplish the requisite communications.

CROSS REFERENCES TO RELATED APPLICATIONS

Copending application Ser. No. 607,040 of H. P. Schlaeppi entitled "Control Mechanism for a Multi-Processor Computing System" filed Jan. 3, 1967, now Pat. No. 3,480,914 and U.S. patent application Ser. No. 653,097 of G. C. Driscoll and M. Lehman entitled "Task Selection in a Multiprocessor Computing Ssystem" filed July 13, 1967 now Pat. No. 3,496,551 both disclose multiprocessor computing systems wherein a mechanism is provided allowing the individual processors to communicate with each other over a special interconnection buss which is dedicated to such purpose.

Copending application Ser. No. 744,185 of G. C. Driscoll entitled "Processor to Processor Communication in a Multiprocessor Computer System" filed July 11, 1968 discloses an overall computer system similar to the one disclosed herein requiring, however, a good deal more special purpose hardware even though existing data busses are used.

BACKGROUND OF INVENTION

Current developments in the computer industry have caused an ever increasing trend towards larger and more sophisticated electronic computers. These trends and developments have to a large extent been made possible by higher speed and less expensive circuit elements. Further increases of system throughput have come from the improved organization of computing systems. A form of computer organization which is receiving ever increasing interest is that of the multi-processor system wherein several autonomous processing units are provided which are capable of sharing a common task or which may work on completely separate tasks.

In any such multi-processor computing system means must be provided for controlling the application of a system's resources such as processors, storage space and input/output (I/O) devices to work on the overall load presented to the system by the various users. The functions which this portion of the system has to perform are often referred to as executive functions. They are determined by the operational requirements of the user community.

The methods available for implementing these functions and their efficiency depend on certain properties of the system architecture, the structure imparted by users and system to the information manipulated, and the structure of processes the system creates during operaion.

The design goal of any computer system is to achieve the highest overall efficiency consistent with meeting a set of general operational objectives which may be summarized by the requirement that an individual user receives the full benefit from the large pool of resources and information existing in the system, so as to secure service within a time interval specified by the user (subject to capacity limitations) at the lowest possible cost.

In order to describe the present invention, certain terms should first be defined. A multi-processor is considered to be a computing system that comprises a number of autonomous processors sharing access to a common storage area or memory and capable of executing programs concurrently. The term "job" is used to designate the entire activity that is engendered in the system by the acceptance of an individual user request for computation. A multiprocessor is capable of processing several independent jobs concurrently.

It is well known that many jobs can be dissected into sequences of instruction executions which are logically almost independent from each other. These sequences may be called "tasks." Given a job that is composed of several tasks, a multiprocessor can be made to process these concurrently. This mode of operation is normally termed "parallel processing."

The present invention represents an attempt to solve the problem of providing facilities that permit user and executive tasks running concurrently, to interact with each other where appropriate, without having to intersperse the programs with numerous test instructions for this purpose, which could be wasteful memory space and storage cycles.

A number of prior art attempts towards the design of various sized multi-processing systems have been made including controls which relied upon functionally specialized wiring between processors for the purposes of interaction, however, this approach is costly in hardware and is functionally limited.

The first two previously referenced copending applications, which are also assigned to International Business Machines Corporation, disclose a powerful multi-processing system utilizing a common interaction buss and individual interaction controllers associated with each processor. Each of said interaction controllers is capable of communicating with any other interaction controller over said buss. However, this solution, while considerably superior to either of the aforementioned prior art solutions, nevertheless requires considerable hardware and the special interaction buss.

The latter referenced copending application utilizes existing storage module busses for interactive communication however, this docket requires a number of specialized gating controls and specialized control hardware in both the individual processors and the memory for both sending and receiving messages. For smaller, less expensive systems it is, of course, desirable to effect multi-processor system configurations with as little additional or specialized hardware as possible.

SUMMARY OF THE INVENTION AND OBJECTS

It has been found that satisfactory communication may be achieved between individual processors in a multiprocessing system including a plurality of said indivdual processors, a central memory and a bussing facility for connecting the individual processors to said central memory by providing special storage areas for basic control function of each processor in said central memory. The system controls utilize existing machine cycles and hardware to leave message information for a potential recipient processor in the central memory and also for picking up information in said central memory from a sending processor.

The system thus uses essentially existing data paths, execution cycles and hardware. By adding a minimum of additional control hardware and by providing a small amount of additional memory space a practical processor to processor communication link may be achived.

It is a primary object of the present invention to provide an intercommunication facility within a multi-processor system configuration utilizing a minimum of additional hardware.

It is a further object of the invention to provide such a multi-processor system wherein existing data links and central memory controls set up message transmission paths.

It is a still further object to provide such a multiprocessor system wherein extra memory space is allocated to store indications of message receipts and transmission and to keep track of current activity.

It is yet another object of the invention to provide such a system wherein existing processor execution controls operate essentially conventionally in the absence of a message tranmission or receipt indication but which may branch to message situations when required.

It is a still further object of the invention to provide such a system wherein existing hardware is utilized in each processor and central memory for both sendng and receiving messages with the aid of special storage space in said central memory.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 6 illustrates the special control memory format indicating the data content and the associated addresses for the expanded memory storage facilities in central memory necessary in practicing the present invention.

DESCRIPTION OF THE DISCLOSED EMBODIMENT

Figure 1A:
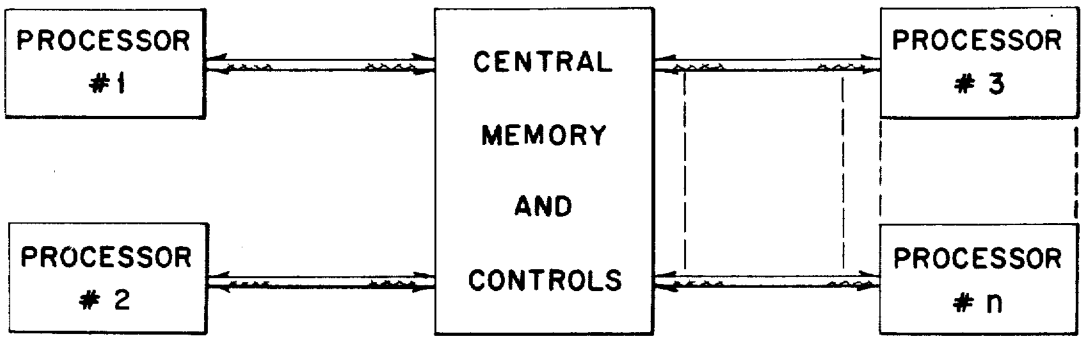
FIG. 1A comprises a functional block diagram of a preferred embodiment of an overall multi-processor system showing the Central Memory and plural processors.

The objects of the present invention are accomplished in general by a method of effecting processor to processor communication in a multi-processor computer system including a central memory and a plurality of individual processors serviced thereby. The method comprises the steps of providing storage space in said central memory in predetermined fixed locations for each processor for storing message information, executing instructions in each processor in a conventional manner until a "send message" instruction is detected, and determniing the recipient processor specified by said "send message" instruction. The central memory is then accessed at the fixed predetermined storage location for said "recipient" processor and message identifying data is stored at said storage location. Upon completion of the storage operation, the "sending" processor resumes its normal instruction execution sequence. At fixed predetermined times during the operational cycle of each processor, the processor accesses the central memory at its own predetermined fixed storage location to determine if any message information data is present therein. If so, the inquiring processor is notified and the message information is accessed and the requested task performed on some fixed predetermined priority basis. Upon execution of the message the central memory is returned to its original state at the fixed predetermined storage location.

The principles of the present invention as disclosed herein assume a multi-processor computing system having a central memory wherein a central timer storage area is provided and wherein a specified predetermined data word location is provided for each processor in the system which word is utilized as the processor Timer. With many conventional computer systems, such for example, as the IBM System 360 Model 50, the processor examines its Timer on a periodic basis and continues to perform a given task as long as the timer is not currently set to a "1" which would indicate that time is up and a timer interrupt routine must be initiated in the processor. In such systems a central system clock periodically decrements the timer in a well known manner and as a new task or job is begun, the timer is initially loaded with a fixed number determined by the supervisory system. A typical commercially available multiprocessor system comprising a plurality of individual processors sharing a large central memory is the IBM 9020 System including up to four individual System 360 Model 50 processors.

Thus, a mechanism is conventionally provided in many computer systems for accessing such a timer periodically to properly allocate the processor's time to various tasks and jobs in the system. The present invention utlizes this fact in providing an extended timer storage facility so that message information may be stored for each individual processor of the system at a point in memory preferably, but not necessarily, adjacent its normal timer location. The system further provides a small amount of additional hardware in the form of a Send Clock which is initiated when a "send message" instruction is detected in the individual processor instruction register. Briefly, this mechanism allows the proper information to be stored in the predetermined storage area for the "recipient" processor. Secondly, a Receive Clock is provided which is initiated by the detection of a "message" signal in the Central Memory storage location for a particular processor during the current timer check activity. Upon the detection of such a message, the current task being performed by the Recipient Processor is terminated as soon as possible and the service requested by the message is performed by the processor after which the processor will return to the interrupted task.

It should be understood that the message left by the "Sending" processor for a "Recipient" processor would normally be an address in memory of the first instruction of an instruction list which would comprise the message or requested service list. Thus, the message left in the Timer for a "Recipient" processor would normally be an address and not of course a specified instruction.

It will be apparent from the above general description of the system and the manner in which it operates that the system could readily be embodied by a skilled system designer in a number of different forms. It should be understood that the presently disclosed embodiment is believed to represent a direct design approach utilizing as much basic system hardware as possible and supplying additional special purpose control hardware only as needed.

The invention will now be described with reference to the accompanying drawings. In describing the embodiment, a multi-processor system is assumed having a plurality of processors connected to a common central storage system or memory. This is shown in FIG. 1A, it being noted that only the processors and the central memory are shown. The various system input/output devices are not disclosed as these would be conventional and form no part of the present invention. Each processor is further assumed to be provided with an internal interruption system, and as stated previously, the overall system is provided with a clock which is utilized to count down the various processor Timers.

Figure 1B:
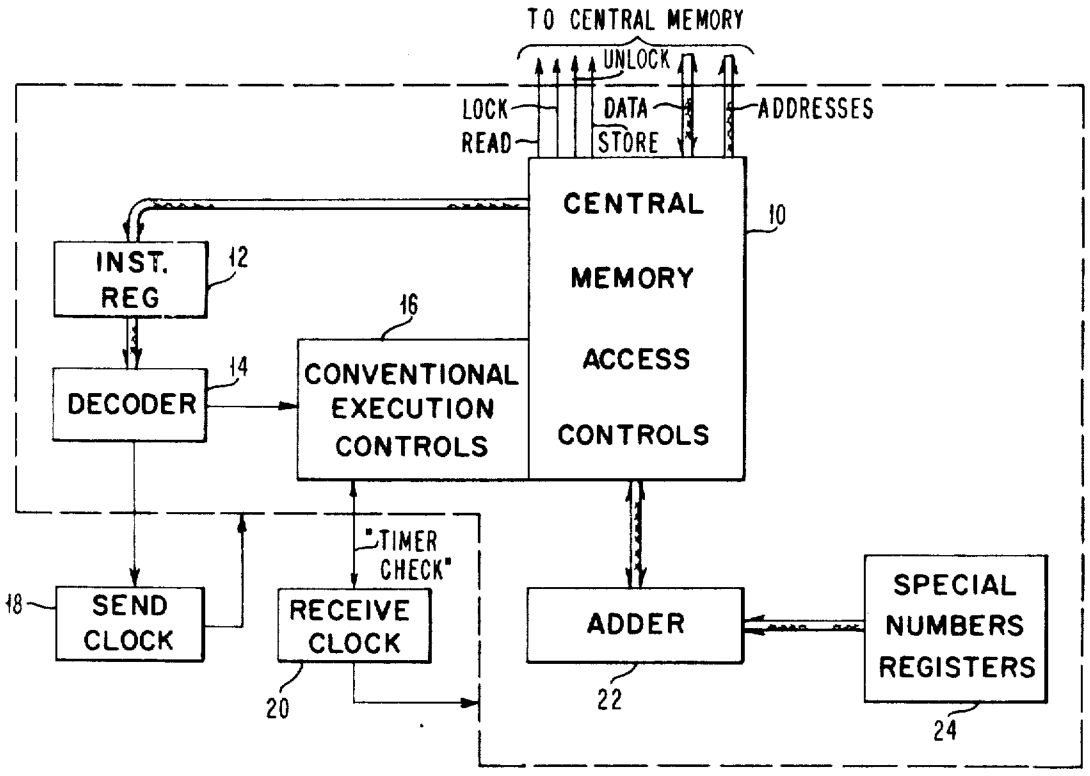
FIG. 1B comprises a functional block diagram of the individual processor controls required for the present embodiment.

FIG. 1B comprises a functional schematic diagram of the primary functional units within each processor of the system as shown in FIG. 1A. As stated previously, it is assumed that each processor has I/O channels which time-share the processor hardware and which are conventional in nature and are not shown specifically herein. It is further assumed that each processor has a Condition Code and a register for storing same such as is conventional in current computers and is found specifically in the IBM System/360. It is further assumed that an Execute Instruction is performable by the system and further that a mechanism is provided for creating certain interlocks similar in function to the IBM System/360 TEST & SET instruction. The EXECUTE instruction differs from a conventional instruction in that it causes a word at a specified location to be executed without otherwise changing the sequence of instructions to be executed. The existence of the EXECUTE instruction facility provides a control point to which the present system may be conveniently connected to avail itself of existing system hardware as will be apparent from the subsequent description of the system and specifically the flow chart of FIG. 3.

Referring again to FIG. 1B, each processor includes a Central Memory 10 and appropriate accessing controls together with an Instruction Register 12 and a decoder therefor 14. The output of the decoder is shown going to the Execution Controls 16 which are conventional in nature and will only be referred to when describing certain of the special function flip-flops utilized in monitoring certain operations in the present mechanism. The more significant output of the decoder 14 is that connected to the Send Clock 18 which, as stated previously, is initiated by the detection of a "send message" instruction. This clock then takes over operation of the system and causes the necessary operations to be performed which leave the message in central memory for a "recipient" processor. The Receive Clock 20 (T-Clock), as stated previously, is initiated by the necessity of periodically checking the Timers in central memory by the various processors of the system. When a message is found during this checking operation denoted as "timer check" on the figure, a specific "receive message" sequence is initiated within the Receive Clock 20. The block denoted as the Adder 22 might either be a special purpose address generation adder conventionally present in large scale systems or in a smaller system, this Adder would constitute additional special purpose hardware for the purpose of generating special addresses and timer parameters as will be apparent from the subsequent description. The Special Numbers Registers 24 merely refer to some of the special purpose holding registers shown in the preferred embodiment utilized for the purpose of generating special addresses and timer parameters.

Figures 2, 2A:
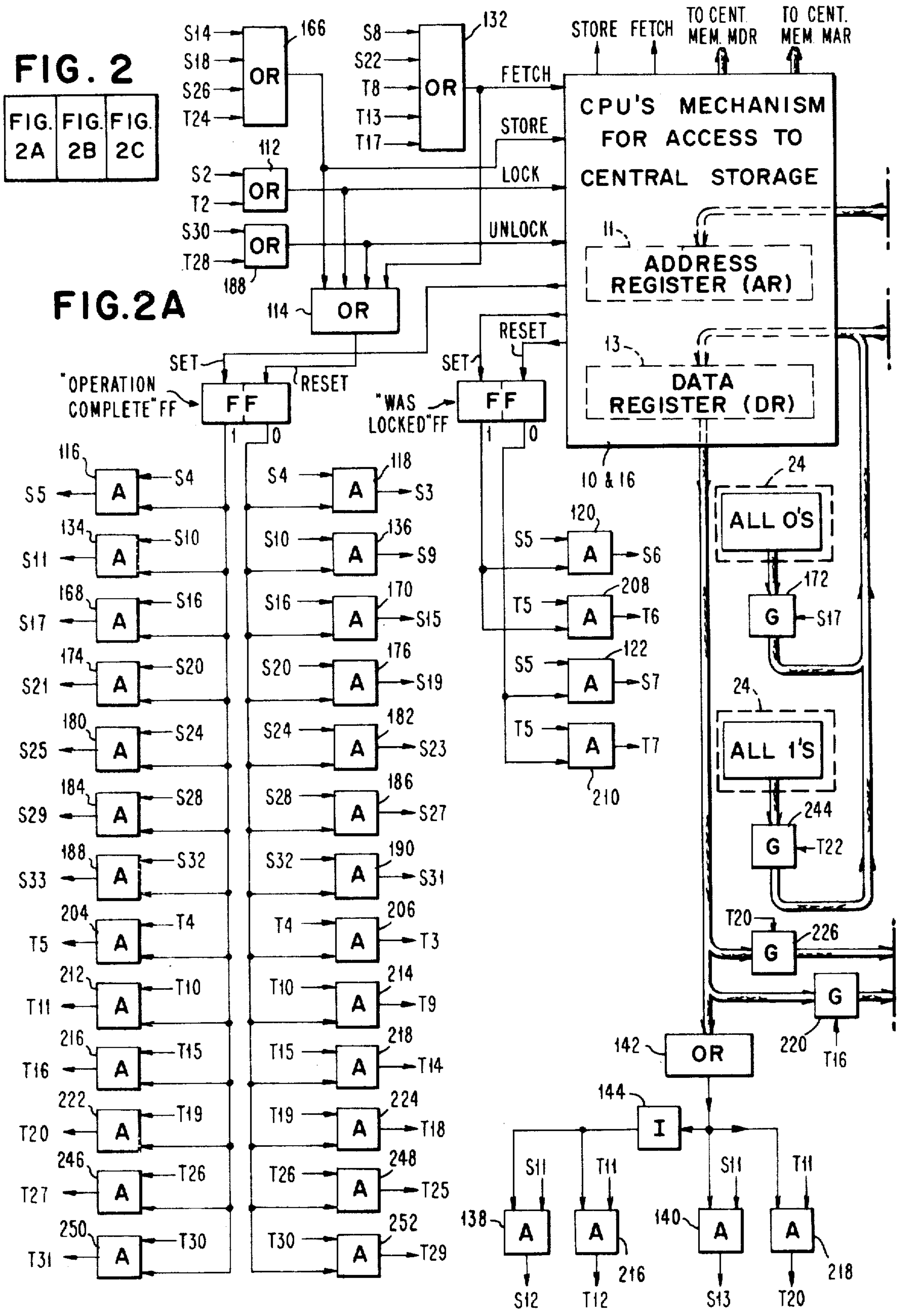
FIG. 2 comprises an organizational drawing illustrating the layout of FIGS. 2A–2B.
FIGS. 2A–2C comprise a combined functional and logical schematic diagram of an individual processor controls required for practicing the present invention.
Figure 2B:
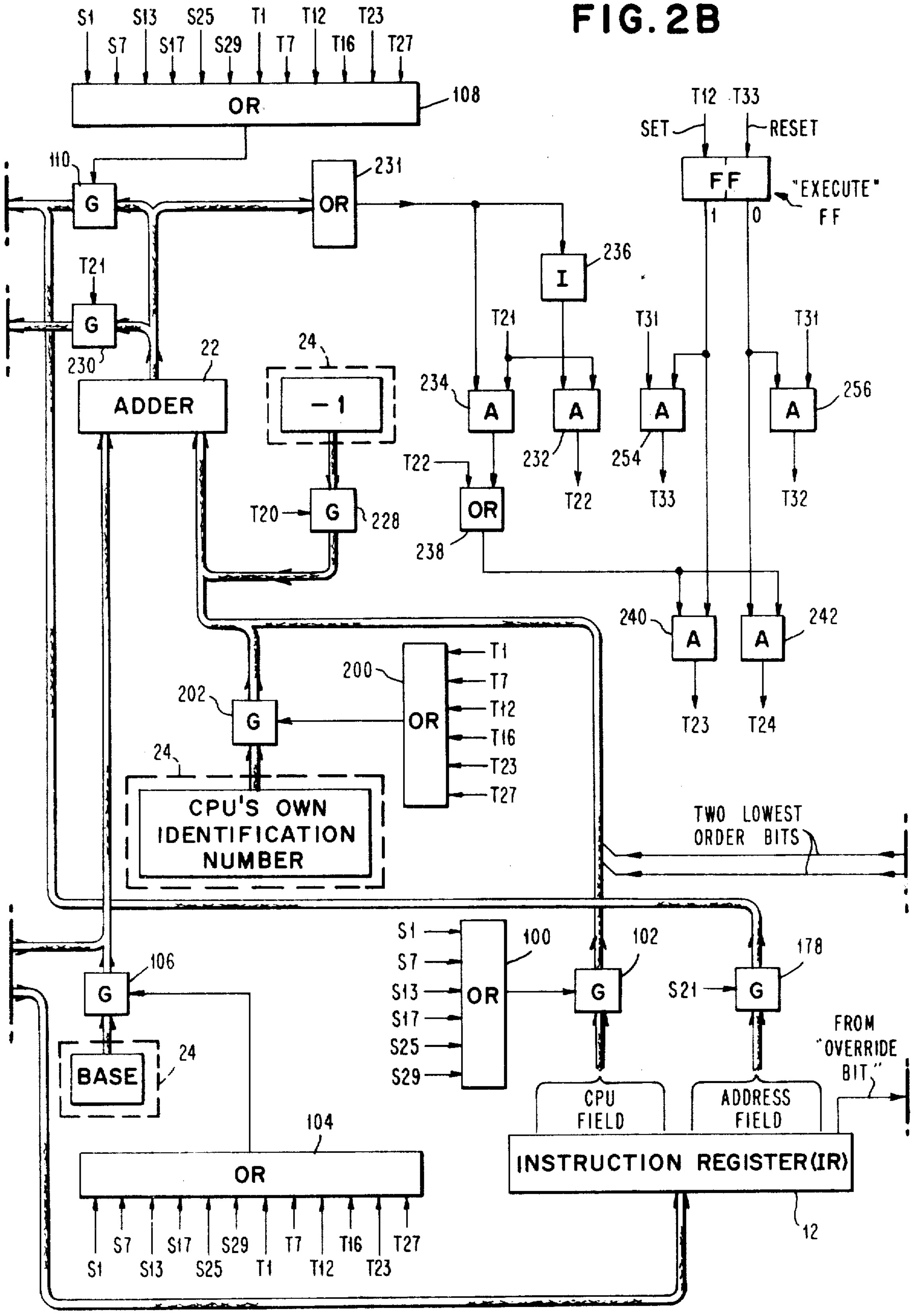
Figure 2C:
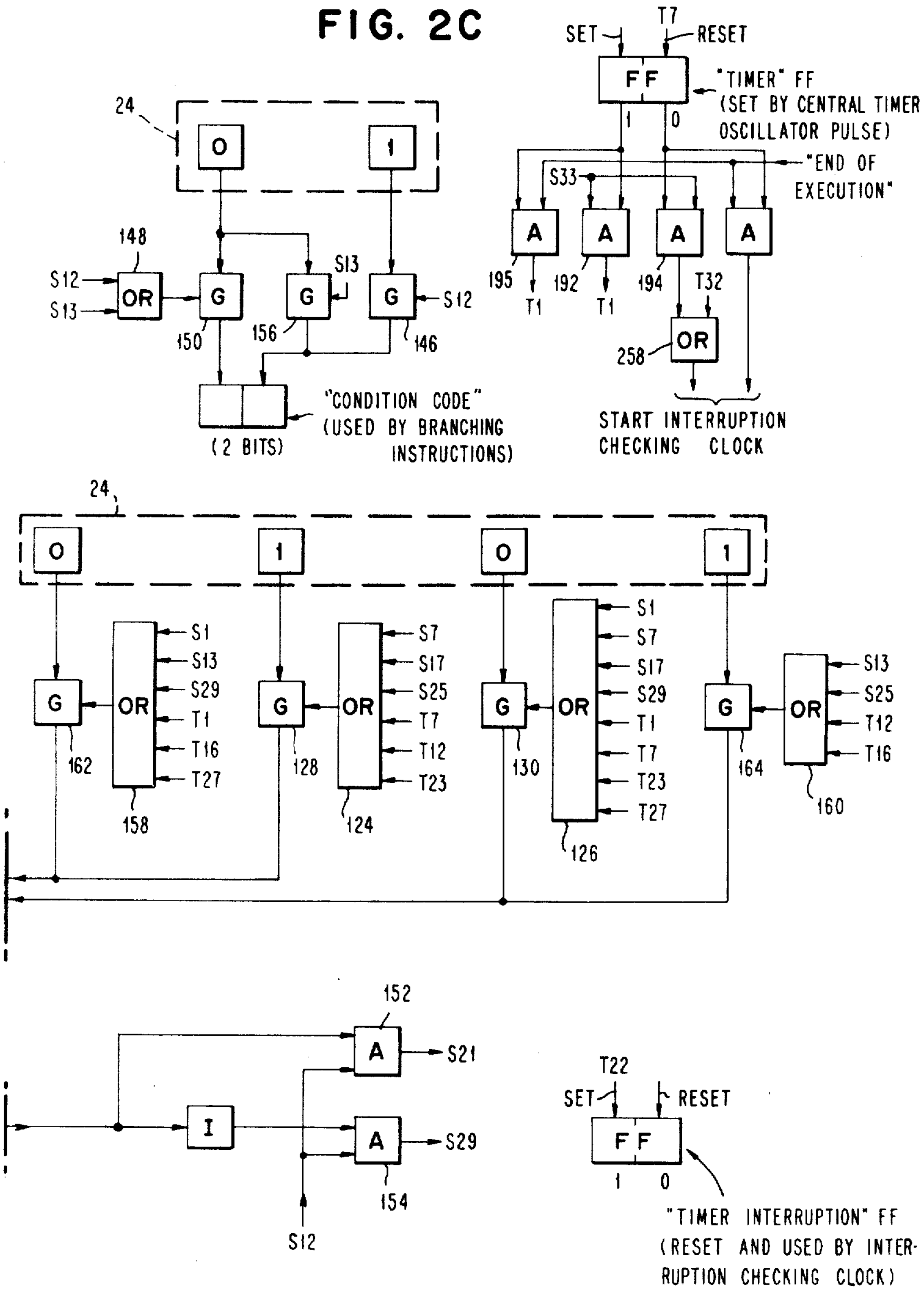

Included in the logical schematic diagram of FIGS. 2A–2C are a number of special control circuits connected to certain of the existing control units, such as the "execute" flip-flop, the "timer interruption" flip-flop, the "timer" flip-flop, etc. and also receiving inputs from the Send and Receive Clocks. The operation of these control circuits is completely straightforward from the logical point of view and will be set forth in the subsequent description of FIGS. 2A–2C with reference to the Timing Sequence Charts.

Figure 3:
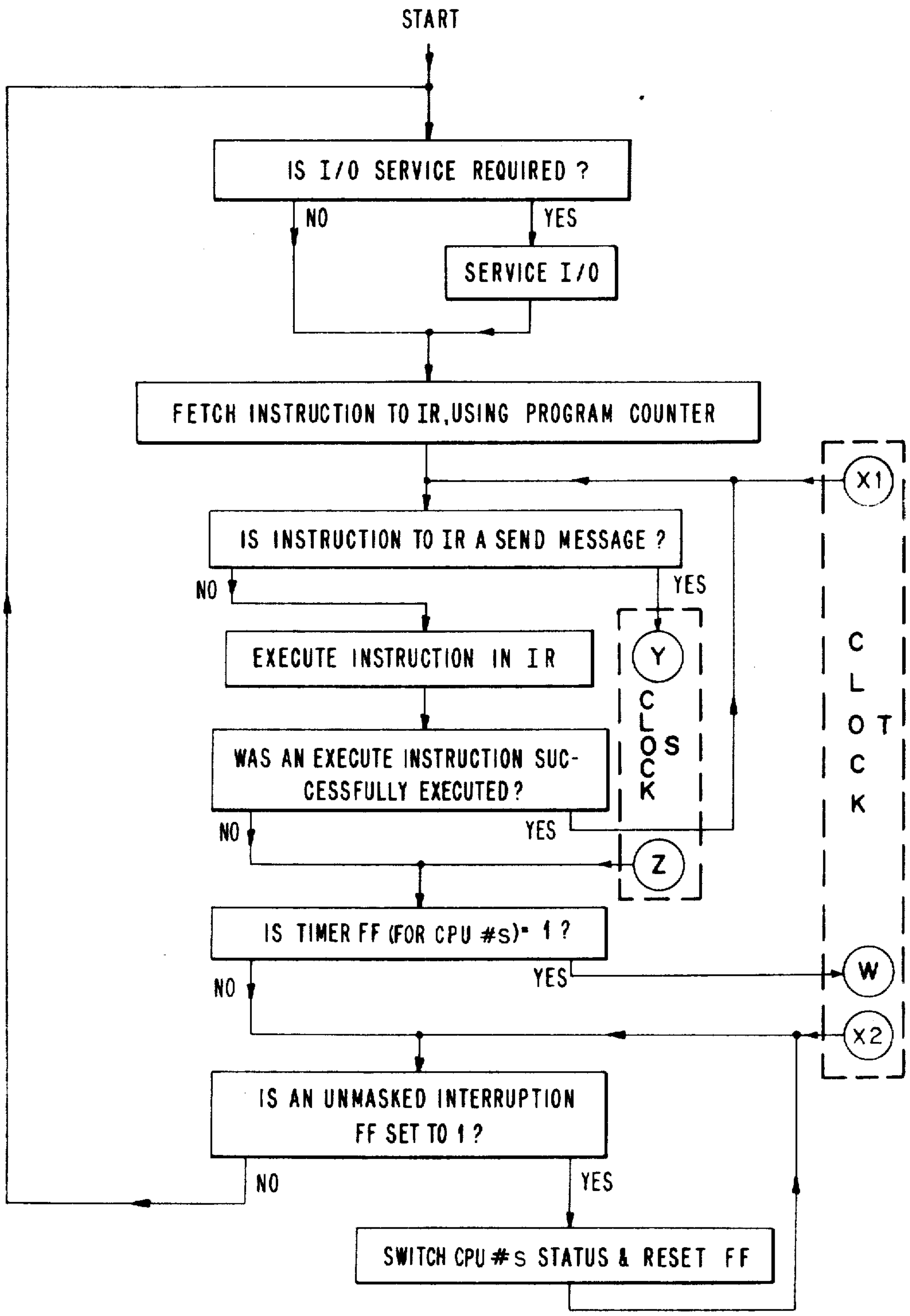
FIG. 3 is a flow chart of an overall flow sequence for a conventional processor indicating the branch point where it is necessary to send and receive message commands.
Figure 4:
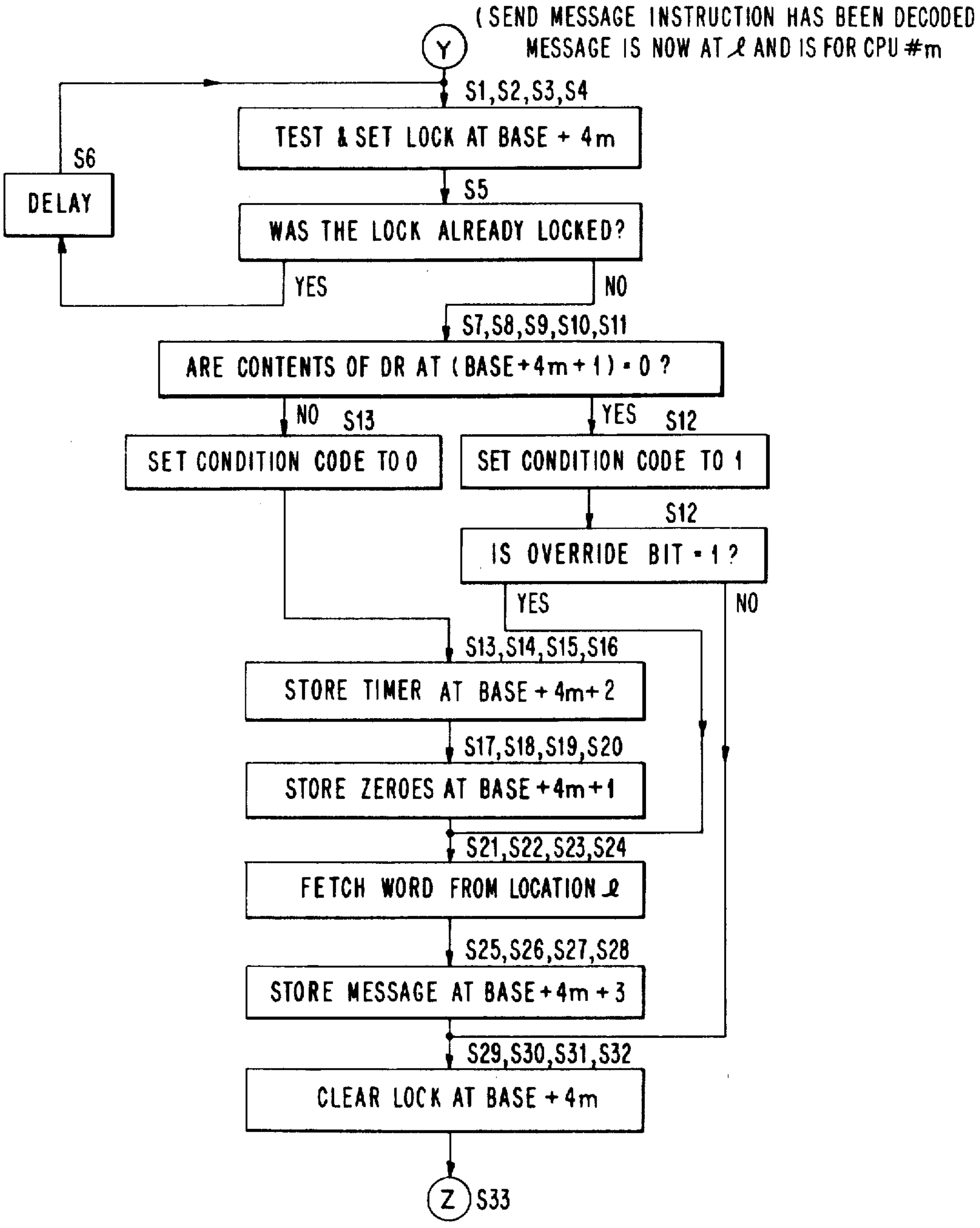
FIG. 4 is a flow chart of the S Clock indicating the operations during a send sequence.
Figure 5:
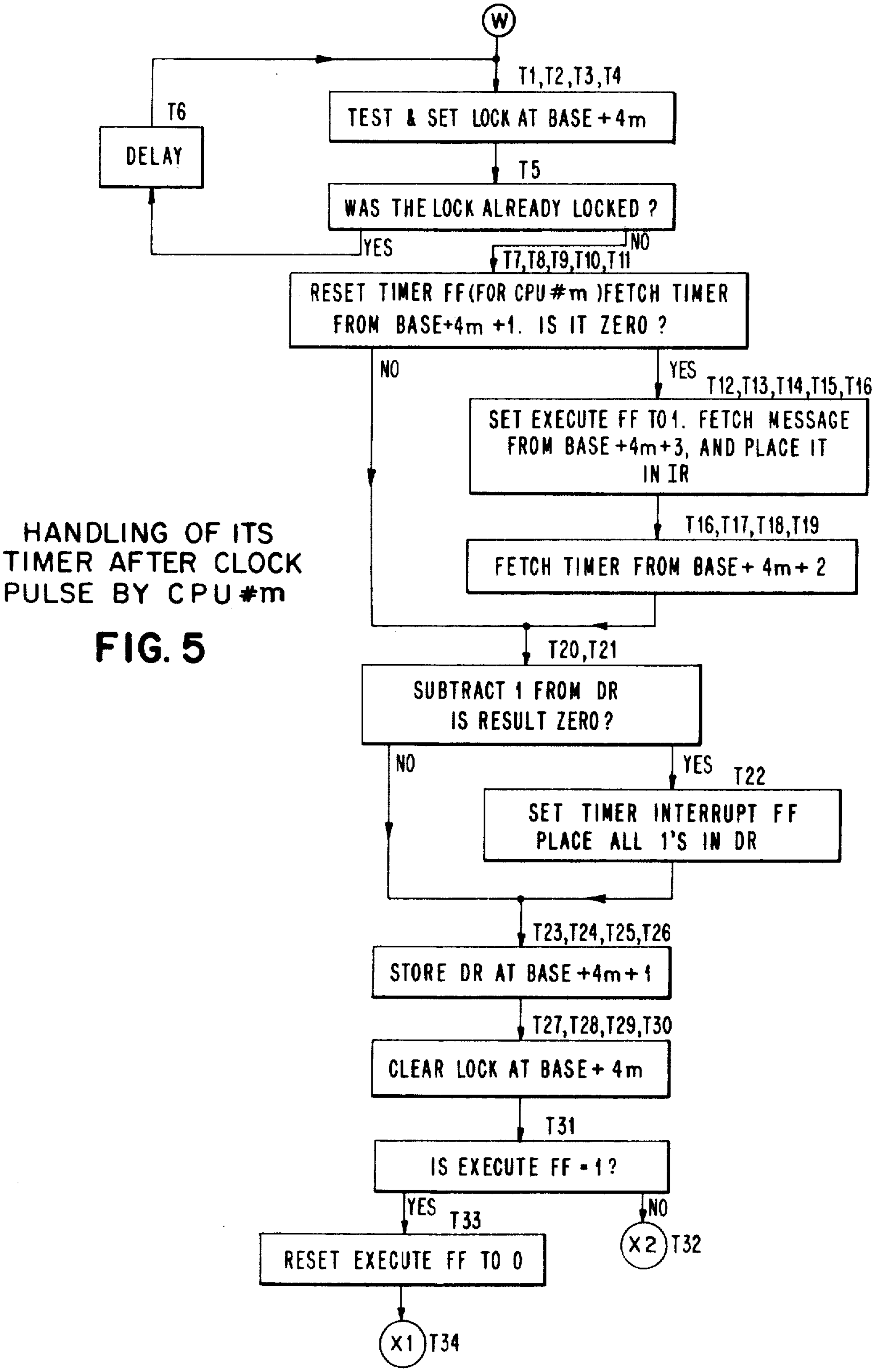
FIG. 5 is a flow chart of the T Clock illustrating a message fetch operation.

FIG. 3 shows the main scan function for one of the processors. First, any needed I/O is performed. Then an instruction is executed. If this instruction should be an EXECUTE successfully carried out, then the object instruction is executed. The only instruction the details of whose execution are relevant to the present invention is the "send message" instruction. In FIG. 3 the execution of the "send message" instruction takes place between point "Y" and point "Z"; the details of which are shown in FIG. 4. Continuing with FIG. 3, it may be seen that after a non-EXECUTE instruction has been executed, the "timer" flip-flop is checked. This flip-flop is set by the clock mechanism which is used to trigger the counting down of the Timer. It is reset by a conventional timer manipulation routine. This rountine is shown in FIG. 5 and lies between point "W" on the one hand and point "X1" and point "X2" on the other, in FIG. 3. After the Timer has been taken care of, if necessary, any outstanding interruption requests are handled. The processor than turns to I/O service once more.

FIG. 4 illustrates how the instruction disclosed here, the "send message," is executed. A block of storage beginning at a storage location BASE, is reserved for (1) interlocks, (2) timers, (3) alternate timers, and (4) messages—one of each for each processor, for a total of four contiguous words of storage allocated per processor.

FIG. 6 illustrates a typical section of Central Memory utilized for storing the timer, and message information neccesary to practice the invention. The addresses would normally be generated by the Adder 22. As indicated in FIG. 6, each processor has its own set of four storage locations.

The "lock" prevents a processor from entering the storage area while another processor (either a "send" or "recipient" processor) is using same. This is a quite conventional interlock procedure.

The "timer," as stated previously, is the timing mechanism conventionally utilized in such systems (multi-or-single-processor) to allocate processor times to various jobs or tasks. It is this timer which is periodically accessed, checked and decremented by a conventional control system.

The "alternate timer" is utilized to store the "Timer" of a "recipient" processor when it is to receive a message and allows the "recipient" processor to return to its previous job at the same timing point after performing the message task.

Finally, the "message" word would normally contain the address in central memory of the first instruction of the message or job requested of the "recipient" processor by the "sending" processor.

Returning now to FIG. 4, it will be assumed that CPU #*s* has decoded a "send message" instruction; one field of that instruction indicates that the message is for CPU #*m*, and another field the address in central memory at which the actual message (instruction) is located.

First, CPU #*s* checks and locks the interlock for CPU #*m*, located at BASE+4*m*, thus insuring that no undesired overlapping of references to the Timer, Alternate Timer, and Message words for CPU #*m* occurs. When it has secured exclusive access by locking the lock (assuming it was unlocked) CPU #*s* checks the Timer for CPU #*m*. It will be zero when there is a message waiting for CPU #*m* and only then. The value of the Condition Code after the execution of a "send message" instruction indicates whether there was already a message waiting. If there is no message waiting, CPU #*s* places the timer at the alternate timer location and puts zeroes ("0's") in the Timer location, to indicate that a message is waiting. It then places the message from its own instruction register in the message word location, and clears the interlock. If, on the contrary, there was a message waiting, two alternative actions are provided, chosen between by a bit in the instruction, the Override Bit. If this bit is zero, no message is placed; the only action is to clear the lock. If on the other hand, the bit is a "1," then the waiting message is overwritten by the message referred to by this instruction; it is not necessary to modify the Timer, since it was suitably reset when the previous message was placed. Clearly, there are many other ways of handling multiple messages within the scope and spirit of the present invention; they could for example be chained together in the usual manner, or instead of a single message word there could be a block of message words, one for each of the other processors in the system.

FIG. 4 thus shows how messages are placed for processors. This procedure is essentially controlled by the S Clock referred to previously. FIG. 5 shows how messages are picked up and acted upon, and how this process is integrated with the already known procedures for counting timers down and generating timer interruptions. This latter procedure is essentially controlled by the T clock. Both the S and T Clock sequences are detailed in the Timing Sequence Charts.

If, at the end of the execution of a non-EXECUTE instruction, the Clock flip-flop for CPU #*m* is on (having been set by any well-known clock pulse mechanism), then this processor gains exclusive access to its Timer, Alternate Timer and Message area of central memory, as shown in FIG. 5. Note that the interlocking procedure is the same for placing messages, for counting down timers, and receiving messages. Then it resets its Clock flip-flop so that in the next processor cycle (after another instruction has been exceuted) the Timer will not be serviced again unless another clock pulse has occurred. It fetches and examines its Timer. If the Timer is not zero, there is no message waiting. If, on the other hand, the Timer is zero, then there is a message; the processor fetches the message and places it in its Instruction Register (IR), setting the "Execute" flip-flop so that this message will be executed as an instruction later; it also fetches the Timer from the Alternate Timer location. In either case, the true timer value is now on hand in the Data Register (DR). In the usual manner, it is decreased by one, and if the result is zero a flip-flop calling for a Timer Interruption Cycle is set and the Timer value is replaced by the maximum value, all "1's." Whether the Timer had become zero or not, the new value is now stored in the Timer location and the lock for CPU #*m* is cleared. If there was no message, the processor goes on to consider possible interruptions. If there was a message, the processor resets its "Execute" flip-flop and enters that part of its cycle which follows the successful execution of an EXECUTE instruction; thus the message, which is now in the instruction register, is executed. The message might cause, for example, the loading or storing of data, or a branch, or an interruption of the Supervisor Call type.

The above description of the flow charts of FIGS. 3, 4 and 5 and the description of the Central Memory special storage area shown in FIG. 6 completes the description of the broad concepts of the present invention. It is believed that by utilizing this description and the various suggestions therein any one skilled in the art could modify most existing multi-processor computing systems to effect processor-to-processor communication with a minimal amount of additional special purpose hardware.

The subsequent description of the specific embodiment shown in FIGS. 2A–2C (henceforth referred to generally as FIG. 2) is for the purpose of setting forth a preferred embodiment, however, the details of the embodiment are not intended to be limiting on the broad spirit and scope of the invention.

Before proceeding with the detailed description of FIG. 2, it should be noted that the following Timing Sequence Charts set forth the specific operations of the present system called for by the flow charts of FIGS. 3–5 and specifically required by the hardware of FIG. 2. Thus, the S-Clock corresponds to the Send Clock 18 on FIG. 1B and the T-Clock sequence refers to the sequences included in the Receive Clock 20 on FIG. 1B.

It should be noted that the specific clock stages are not shown in the figures as they are completely conventional and would in essence comprise a series of timing singleshots or stages each having an input which initiates the timing stage and wherein a first output pulse is produced when the clock stage turns on and a second output is produced when the clock stage turns off. The turn-on pulse is normally utilized to initiate the various control sequences specifically enumerated and shown in the logical schematic diagrams as indicated by the legends, and the turn-off pulse may be utilized to turn-on another clock stage or in conjunction with other signals to test and branch to other non-sequential steps. For clock stage S8 for example, the stage is turned on or initiated by the the turn-off of stage S7, pulse S8 is produced by the stage, and its turn-off initiates stage S9.

TIMING SEQUENCES CHARTS

S-Clock Delivers Message Information to Central Memory

S1 (Initiated by decoding of "send message" instruction)
Gate BASE and CPU identification field of Instruction
Register (IR) to the Adder, and output of the Adder to the Address Register (AR)
go to S2

S2 Reset operation complete flip-flop to "0"
Call for "Lock" operation
go to S3

S3 Delay only
go to S4

S4 If "operation complete" flip-flop is on "1," go to S5
otherwise, go to S3

S5 If "was locked" flip-flop is on "1," go to S6
Otherwise, go to S7

S6 Delay only
go to S2

S7 Gate BASE, CPU field of IR, and 1 to Adder, and gate Adder output to AR
go to S8

S8 Reset "operation complete" flip-flop to "0"
Call for "fetch" operation
go to S9

S9 Delay only
go to S10

S10 If "operation complete" flip-flop is on "1," go to S11
Otherwise, go to S9

S11 If contents of Data Register equals "0" go to S12
Otherwise, go to S13

S12 Set Condition Code to "1"
If "override" bit of instruction is "1," go to S21
Otherwise, go to S29

S13 Set Condition Code to "0"
Gate BASE, CPU field of IR, and 2 to Adder, and gate adder output to AR
go to S14

S14 Reset "operation complete" flip-flop to "0"
Call for "Store" operation
go to S15

S15 Delay only
go to S16

S16 If "operation complete" flip-flop is on "1," go to S17
Otherwise, go to S15

S17 Gate zeroes to Data Register. Gate BASE, CPU field of IR, and 1 to Adder and gate Adder output to AR
go to S18

S18 Reset "operation camplete" flip-flop to "0"
Call for "Store" operation
go to S19

S19 Delay only
go to S20

S20 If "operation complete" flip-flop is on "1," go to S21
Otherwise, go to S19

S21 Gate address field of IR to AR
go to S22

S22 Reset "operation complete" flip-flop to "0"
Call for "fetch" operation
go to S23

S23 Delay only
go to S24

S24 If "operation complete" flip-flop is on "1," go to S25
Otherwise, go to S23

S25 Gate BASE, CPU field of IR, and 3 to Adder, and gate Adder output to AR
go to S26

S26 Reset "operation complete" flip-flop to "0"
Call for "Store" operation
go to S27

S27 Delay only
go to S28

S28 If "operation complete" flip-flop is on "1," go to S29
Otherwise, go to S27

S29 Gate BASE and CPU field of IR to Adder, and output of Adder to AR
go to S30

S30 Reset "operation complete" flip-flop to "0"
Call for "unlock" operation
go to S31

S31 Delay only
go to S32

S32 If "operation complete" flip-flop is on "1," go to S33
Otherwise, go to S31

S33 Send S-Clock complete signal (which will start Clock T if Timer flip-flop is on "1," and otherwise start interruption checking clock) and end S-Clock.

T-Clock picks up Message Information from Central Memory & Timer

T1 (Initiated by Timer Sequence in CPU Controls)
Gate BASE and the CPU's own identification number to the Adder, and output of the adder to the Address Register (AR)

T2 Reset "operation complete" flip-flop to "0"
Call for "lock" operation
go to T3

T3 Delay only
go to T4

T4 If "operation complete" flip-flop is on "1" go to T5
Otherwise, go to T3

T5 If "was locked" flip-flop is on "1," go to T6
Otherwise, go to T7

T6 Delay only
go to T2

T7 Reset "Timer" flip-flop
Gate Base, CPU's identification number, and 1 to Adder, and gate adder output to AR
go to T8

T8 Reset "operation complete" flip-flop to "0"
Call for "fetch" operation
go to T9

T9 Delay only
go to T10

T10 If "operation" complete flip-flop is on "1," go to T11
Otherwise, go to T9

T11 If contents of Data Register is all zeroes go to T12
Otherwise, go to T20

T12 Set "execute" flip-flop to "1"
Gate BASE, CPU's identification, and 3 to Adder, and gate Adder output to AR
go to T13

T13 Reset "operation complete" flip-flop to "0"
Call for "fetch" operation
go to T14

T14 Delay only
go to T15

T15 If "operation complete" flip-flop is on "1," go to T16
Otherwise, go to T14

T16 Gate Data Register (DR) to Instruction Register (IR)
Gate BASE, CPU's identification, and 2 to Adder, and gate Adder output to AR
go to T17

T17 Reset "operation complete" flip-flop to "0"
Call for "fetch" operation
go to T18

T18 Delay only
go to T19

T19 If "operation complete" flip-flop is on "1," go to T20
Otherwise, go to T18

T20 Gate DR and −1 to adder
go to T21

T21 Gate Adder output to DR
If Adder output is zero, go to T22
If Adder output is not zero and "execute" flip-flop equals "1," go to T23
Otherwise, go to T24

T22 Set "timer interrupt" flip-flop to "1"
Gate all "1's" to DR
If "execute" flip-flop equals "1," go to T23
Otherwise, go to T24

T23 Gate BASE, CPU's identification, and 1 to adder, and gate adder output to AR
go to T24

T24 Reset "operation complete" flip-flop to "0"
Call for "Store" operation
go to T25

T25 Delay only
go to T26

T26 If "operation complete" flip-flop is on "1," go to T27
Otherwise, go to T25

T27 Gate BASE and CPU's identification to Adder, and gate Adder output to AR
go to T28

T28 Reset "operation complete" flip-flop to "0"
Call for "unlock" operation
go to T29

T29 Delay only
go to T30

T30 If "operation complete" flip-flop is on "1," go to T31
Otherwise, go to T29

T31 If "execute" flip-flop equals "1," go to T33
Otherwise, go to T32

T32 Send signal to start interruption checking clock and end Clock T

T33 Reset "execute" flip-flop to "0"
go to T34

T34 Send signal to start instruction execution clock, and end Clock T

Before proceeding with the description of the operation of the system relative to the preceding Timing Sequence Charts, the following comments should be made about the embodiment of FIG. 2. It will be noted that the major sections of this embodiment are referred to by the same reference characters as FIG. 1B. It will be noted that the Decoder 14 and the Conventional Execution Control 13 are not shown on the figure as they are conventional, the only significant feature of the Decoder 14 being that upon the recognition of a "send message" instruction would initiate the clock sequence S1. The various special purpose flip-flops shown in the drawings, such as, "operation complete," "timer interruption," "Timer," and "Execute" flip-flops would in essence be contained in this unit. As will be appreciated only such of these flip-flops (or other bistable storage elements) are shown as required to describe the present embodiment. The various "Special Number" Registers 24 are enclosed with a dotted line and all are generally referred to by the reference numeral 24 on FIG. 2. During the description of the operation of the system additional reference numbers may be utilized to more specifically refer to particular ones of these special purpose registers.

Proceeding now with the description of the present embodiment, it will be assumed that an instruction has been decoded in the Instruction Register 12 calling for a "send message" operation. This initiates the S-Clock.

Pulse S1 is applied to OR circuit 100, which enables 102 to gate the contents of the CPU field of the Instruction Register 12 to the Adder 22. S1 is also applied to OR circuit 104 which enables gate 106 to gate the BASE into the Adder 22. It will be noted that the multiplication of the CPU identification number by 4 is effected by a left shift of 2—a binary system being assumed. This number is then added to the BASE and is transferred into the Address Register 11 by applying pulse S1 to OR circuit 108 which enables gate 110. The turn off of S1 initiates S2.

S2 is applied to OR circuit 112 to initiate a "lock" operation in the memory access mechanism of the processor and which sets the lock for CPU #$m$ to a "1." The pulse is also applied to OR circuit 114 to reset the "operation complete" flip-flop to "0." The turn off of S2 initiates S3. This is a delay stage only and its turn off initiates S4. S4 is applied to AND gate 116 and if the "operation complete" flip-flop is set to a "1," stage S5 will be initiated. Concurrently, S4 is applied to AND gate 118 and if the "operation complete" flip-flop is still set at "0," the system will branch back to S3. Assuming that the system branches to clock stages S5, this pulse checks the setting of the "was locked" flip-flop. S5 is applied to AND gate 120 which received its other input from the "1" side of the "was locked" flip-flop and will branch to clock stage S6 which is in turn a delay stage and goes back to clock stage S2. S5 is concurrently applied to AND gate 122 which receives a second input from the "0" side of the "was locked" flip-flop. If this flip-flop was set to a "0," it means that the "recipient" processor timer storage location is in a condition to be accessed and the system can proceed to clock stage S7.

S7 is applied to OR gate 104 to activate gate 106 to gate the BASE to the Adder 22. Concurrently S7 is also applied to OR gate 100 and gate 102 to gate the CPU number to the Adder 22 where it is, as stated previously, multiplied by 4 by shifting. Finally, S7 is applied to OR gates 124 and 126 to activate gates 128 and 130 to gate an additional 1 into the Adder to obtain the address [BASE$+4\times m+1$]. S7 is also applied to OR circuit 108 and gate 110 to gate the output of the Adder into the Address Register 11. The turn off of S7 initiates S8.

S8 is applied to OR circuit 132 which initiates a "fetch" operation in the CPU's memory access controls, and thus a fetch in the Central Memory. S8 is also applied to OR circuit 114 to reset to the "operation complete" flip-flop to "0." The turn off of S8 initiates S9.

Stage S9 is for delay only and its turn off initiates S10. S10 is utilized to test the setting of "operation complete" flip-flop. S10 is applied concurrently to AND gates 134 and 136 and, depending upon the setting of the "operation complete" flip-flop, the clock will go to S11 if the "operation complete" flip-flop is on "1" and will branch back to S9 if the "operation complete" was on "0."

Assuming the system goes to S11, the S11 pulse is applied to AND circuits 138 and 140 which test the contents of the Timer for the recipient CPU which contents are now in the Data Register 13. Anything other than a "0" in the Timer will produce an output from the OR gate 142. No output from the OR circuit 142 will be inverted by the Inverter 144 to produce one input to the AND gate 138. The other input to this AND gate is from S11, thus, if all zeroes were present clock sequence S12 will be initiated. If, on the other hand, an output from OR gate 142 produces one input to AND circuit 140, the other input provided by S11 will cause the system to branch to the clock stage S13.

First assume that the system branches to stage S12. S12 is applied to gate 146 and to OR circuit 148 thus enabling gate 150 to gate a "01" into the Condition Code Register which as stated previously is utilized by the control circuitry of conventional computers. S12 is also applied to AND circuits 152 and 154 to test for the presence of an "override bit." If a "1" is present, the system branches to stage S21 and if there is none present, the system branches to stage S29. In the former case, it means that the new message is to be written into the recipient processor message storage location regardless of the existence of a prior message and in the latter case it means that the present message must be held up.

Going back to stage S11, assume now that the stage had branched to stage S13. The turn on of S13 is applied to gate 156 and to OR circuit 140 to enable gate 150 to set the Condition Code in the processor to a "00." S13 is also applied to OR circuit 104 and gate 106 to gate the BASE to the Adder 22 and it is also applied to OR circuit 100 to enable gate 102 to gate the CPU identification to the Adder and finally is applied to OR circuits 158 and 160 to enable gate circuits 162 and 164 to gate a "2" (10 in binary form) to the Adder.

The turn off of S13 initiates S14. S14 is applied to OR circuit 166 to initiate a "store" operation in the storage mechanism and also provides an input to OR circuit 114 which resets the "operation complete" flip-flop to a "0." It should be noted that this "store" operation causes the Timer currently stored in Data Register 13 to be stored at the Alternate Timer location. The turn off of S14 initiates S15. S15 is a delay stage only and its turn off goes to S16. S16 tests the condition of the "operation complete" flip-flop. As described previously, S16 is applied to AND circuits 168 and 170, the other inputs to which are supplied respectively by the "1" and "0" sides of the "operation complete" flip-flop. If the "operation complete" flip-flop is on "1" the system proceeds to stage S17. Otherwise, it reverts back to stage S15.

Assuming the system now branches to S17, this pulse is applied to gate 172 to gate all "0's" into the Data Register 13. S17 is simultaneously applied to OR circuits 104, 100, 126 and 124 to gate the BASE, CPU field of the Instruction Register and "1" to the Adder 22 to produce the address [BASE$+4\times m+1$]. S17 is also applied to OR circuit 108 to gate the output of the Adder 22 to the Address Register 11. The turn-off of S17 initiates S18.

Pulse S18 is applied to OR circuit 166 which causes a "store" operation to be called for in the Central Memory and also causes the "operation complete" flip-flop to be set to a "0." The turn off S18 initiates S19, S19 is for delay only and proceeds to S20. S20 tests the "operation complete" flip-flop by applying a pulse to AND circuits 174 and 176. Depending upon the setting of the "operation complete" flip-flop, the system will branch to stage S21 or back to S19. Assuming the operation is complete, the turn on of S21 is applied to gate circuit 178 which gates the address field from the Intruction Register 12 into the Address Register 11. The turn off of S21 initiates S22.

S22 is applied to OR gate 132 which initiates a "fetch" operation in the central Memory through the local accessing mechanim and resets the "operation complete" flip-flop to "0." This causes the Central Memory to be accessed at the address specified by the Instruction Register and causes the data to now be placed in the Data Register 13. The turn off of S22 initiates S23. S23 is a delay stage only and its turn off initiates S24. S24 again tests the "operation complete" flip-flop by applying its pulse to AND circuits 180 and 182 and will either branch to S25 or back to S23 as will be apparent. Assuming the system now goes to S25, this pulse is applied to OR circuit 104, OR circuit 100, OR circuit 160 and OR circuit 124 to gate the BASE, CPU field of the Instruction Register and a 3 to the Adder 22. This generates the address [BASE+4×$m$+3]. S17 is also applied to OR gate 108 to gate the output of the Adder to the Address Register 11. The turn off of S25 initiates S26.

S26 is applied to OR gate 166 to initiate a "store" operation in the Central Memory and reset the "operation complete" flip-flop to a "0." The turn off of S26 initiates S27 which is for delay only and proceeds to S28.

S28 tests the "operation complete" flip-flop by applying pulses to AND circuits 184 and 186. If the operation is not complete, the system branches back to S27. Otherwise, it proceeds to S29.

S29 is applied to OR circuit 104 and OR circuit 100 to gate the BASE and CPU field of the Instruction Register to the Adder 22. S29 is also applied to OR gate 108 to gate the output of the Adder to the Address Register 11. The turn off of S29 initiates S30.

S30 is applied to OR circuit 188 which initiates an "unlock" operation in the Central Memory lock word location for the "recipient" processor and resets the "operation complete" flip-flop to a "0." The turn-off of S30 initiates S31 which is for delay only and proceeds to S32. S32 is applied to AND circuits 188 and 190 and tests whether the operation is complete. Upon completion, the system proceeds to S33.

S33 is applied to AND circuits 192 and 194 and will initiate the T-Clock if the "Timer" flip-flop is on "1" or will start the Interruption Checking Clock if said flip-flop is on "0." The turn off of S33 terminates the S-Clock sequence.

Proceeding to the description of system operation with the T-Clock, it will be assumed that the clock stage T1 in a "recipient" processor $m$ has been initiated by either an output from the AND circuit 192 or an output from 195. As will be remembered from the previous description, after the termination of any conventional instruction execution, the "Timer" flip-flop is checked by the system to see if a "Timer Check" routine is called for. Also as stated previously, the "Timer" flip-flop is set by the Timer Oscillator pulse which causes the CPU to periodically check its Timer with the result that either (1) a message will be detected; (2) an interruption routine will be initiated or (3) the Timer must be decremented by 1 and the preceding task continued.

Assuming that clock stage T1 has been initiated by an output from either AND circuits 192 or 195, this pulse is applied to OR gates 104 and 200 to enable gate 106 and 202 to gate the BASE and the CPU's own identification number into the Adder 22. T1 is also applied to OR gate 106 to enable gate 110 to gate the output of the Adder to the Address Register 11. The turn off of T1 initiates T2.

T2 is applied to OR gate 112 to initiate a "lock" operation in the Central Memory for the particular CPU's Timer storage location and also is applied through OR gate 114 to reset the "operation complete" flip-flop to a "0." It will again be appreciated that the "lock" operation in essence sets the lock for this CPU to a "1" whereby no other processor will be able to access this portion of memory until the present CPU has terminated its current operation.

The turn off of T2 initiates T3 which is for delay only and which on turn off initiates T4. T4 is applied to AND circuits 204 and 206 to test the setting of the "operation complete" flip-flop. If the operation is still incomplete, the system branches back to stage T3, and if complete, proceeds to stage T5. Assuming the system proceeds to T5, this pulse is applied to AND circuit 208 and 210 to test the setting of the "was locked" flip-flop. If the memory was in fact locked, this system branches to T6 which is a delay stage only and branches back to T2, otherwise, the system branches to T7.

Assuming the system goes to T7, the pulse is applied to reset the "timer" flip-flop to a "0." Additionally, T7 is applied to OR circuit 104, OR circuit 200, OR circuit 124 and OR circuit 126 to gate respectively the BASE, CPU's own identification number and a 1 to the Adder 22. The output of the Adder 22 is gated to the Address Register 11 by applying pulse T7 to OR circuit 108. The turn off of T7 initiates T8.

T8 is applied to OR circuit 132 which initiates a "fetch" operation in the Central Memory and also through OR circuit 114 resets the "operation complete" flip-flop to a "0." The turn off of T8 proceeds to T9 which is for delay only whose turn off initiates stage T10. Stage T10 is applied to AND circuits 212 and 214 to determine if the current memory operation is complete. If incomplete, the system branches back to clock stage T9 and if complete, proceeds to T11. T11 tests the contents of the Data Register 13 by applying a pulse to AND circuits 216 and 218. If all zeroes were present in the Data Register, no output would be produced from 142 which would in turn produce an output from Inverter 144, and thus produce an output from AND circuit 216 to branch the system to clock stage T12. If on the other hand, all zeroes were not present, the system would branch forward to clock stage T20 by producing an output from AND circuit 218.

Assuming that the system branches to clock stage T12, this pulse is applied directly to the "execute" flip-flop to set same to a "1." T12 is similarly applied to OR circuits 104, 200, 160, and 124 to gate respectively the BASE, CPU's identification number and a 3 to the Adder 22. T12 is likewise applied to OR circuit 108 to gate the output of the Adder 22 to the Address Register 11. The turn off of T12 initiates T13.

T13 is applied to OR circuit 132 to initiate a "fetch" operation in Central Memory and reset the "operation complete" flip-flop to a "0." The turn off of T13 initiates T14 which is for delay only and on turn off proceeds to T15. T15 checks the setting of the "operation complete" flip-flop by applying a pulse concurrently to AND circuit 212 and 214. If the operation is complete, the system branches to T16, if not, to T14. Assuming the system branches to T16, this pulse is applied to gate circuit 220 to gate the contents of the Data Register 13 to the Insruction Register 12. T16 is also applied to OR circuits 104, 200, 158, and 160 to gate respectively the BASE, CPU's identification number and a 2 to the Adder 22 and subsequently T16 is applied to OR circuit 108 to gate the output of the Adder to the Address Register 11. The turn off of T16 proceeds to T17.

T17 is applied to OR circuit 132 to initiate another "fetch" operation in Central Memory and reset the "operation complete" flip-flop to a "0." The turn off of T17 initiates T18 which is again for delay only and proceeds to T19 which tests the setting of the "operation complete" flip-flop by applying pulses concurrently to AND gates 222 and 224. If the operation is complete, the system proceeds to T20, if not, it reverts back to T18. Assuming the operation is complete, the turn on of T20 is applied to gate circuit 226 which gates the contents of the Data Register 13 to the Adder 22 and also to the gate 228 to gate a −1 to the Adder 22. The turn off of T20 proceeds to T21.

T21 is applied to gate 230 to gate the output of the Adder back into the Data Register 13. The output of Adder 22 also passes through OR circuit 231 and forms one input to AND 234 and Inverter 236 which in turns feeds AND 232. T21 provides the second input to AND circuits 232 and 234. If the Adder 22 output its all zeroes, AND circuit 232 will have an output and the system will branch to clock stage T22. If on the other hand, the Adder output is not all zeroes, AND circuit 234 will have an output which passes through OR gate 238 and provides one input to the AND gates 240 and 242, the other inputs to which comes from the "execute" flip-flop. If the said flip-flop is on "0," the system will branch to clock stage T24 and if said flip-flop is set to a "1," the system will branch to clock stage T23.

Assuming now that the first condition of T21 was met and the system branched to stage T22, this pulse is applied to set the "timer interruption" flip-flop to a "1." T22 is also applied to gate 244 to gate all ones into the Data Register 13. T22 is similarly applied to OR gate 238 to provide one input to the two AND circuits 240 and 242 to test the setting of the "execute" flip-flop. If on "1," the system branches to stage T23 and conversely if on "0," the system branches to clock stage T24.

Assuming that the system branches to T23, this pulse is applied to OR circuits 104, 200, 124, and 126 to respectively gate the BASE, CPU's identification and a "1" to the Adder 22. By also applying T23 to OR gate, 108, the output of the Adder 22 is gated to the Address Register 11. The turn off of T23 initiates T24.

T24 is applied to OR gate 166 to initiate a "store" operation in Central Memory and through OR gate 114 to reset to the "operation complete" flip-flop to "0." The turn off of T24 initiates T25 which is for delay only and then proceeds to T26 which in turn checks the setting of the "operation complete" flip-flop by applying a pulse concurrently to AND circuits 246 and 248. If the operation is complete, the system proceeds to stage T27, if not, it reverts back to T25.

Assuming the system has proceeded to T27, this pulse is applied to OR circuits 104, and 200 to gate respectively the BASE, CPU's identification to the Adder 22 and this pulse is subsequently gated to OR circuit 108 to gate the output of Adder 22 to the Address Register 11. The turn off of T27 initiates T28. The turn on of T28 is applied to OR circuit 188 which initiates on "unlock" operation in Central Memory to in effect reset the Lock for CPU #*m* to a "0." The output from OR 188 is also fed through OR 114 to reset the "operation complete" flip-flop to a "0." The turn off of T28 initiates T29 which is for delay only and on turn off proceeds to T30 which checks the setting of the "operation complete" flip-flop by applying pulses to AND circuits 250 and 252. If the operation is complete, the system proceeds to T31. If not, it reverts back to T29.

Assuming the operation is complete, the turn on of T31 checks to see if the "execute" flip-flop is set to a "1" by applying pulses to AND circuits 254 and 256, the other inputs to which come from the "1" and "0" sides of the flip-flop respectively. If on "0," the system proceeds to T32. If on "1," the system proceeds to T33. Assuming the system proceeds to T32, this pulse is applied to OR circuit 258 adjacent to the "timer" flip-flop, the output of which starts the Interruption Checking Clock.

If the output of T31 causes a branch to T33, this pulse is applied to reset "execute" flip-flop to "0" and its turn off initiates T34. T34 is merely used to signal the conventional control system to again start the normal Instruction Execution Clock and its turn off ends the T-Clock.

The present description of FIG. 2 with reference to the various timing stages as detailed in the Timing Sequence Charts thus completes the description of the disclosed embodiment of the invention. It should of course be understood that many modifications and variations of the basic system might be made by a person skilled in the art depending, among other things upon the particular multiprocessor configuration present.

Another way of handling messages within the spirit and scope of the invention would be to cause a message interruption rather than the execution of the mesage. Alternatively, one might store the value "1" rather than "0" in the Timer when placing the message, and always store "0" in the Alternate Timer immediately after replacing the Timer value by the contents of the Alternate Timer; then the Timer would never have the value "0" when fetched, and it would be up to the interruption routine triggered by the Timers going to "0" to distinguish between messages and true Timer interruptions, by examining the contents of the Alternate Timer word.

The broadest concept of the invention as will be apparent is the utilization of the expanded Central Memory storage area for the Timers for each CPU, which Timers are periodically and regularly checked by each CPU when proceeding through a normal instruction execution cycle. By placing message indications and message information at these locations, which information is accessible to each CPU, processor intercommunication may be effected without materially adding to the overall system expense.

It should also be understood that it would be possible to practice the present invention by programming a general purpose computer system connected in a multi-processor configuration. However, it is believed that the presently disclosed embodiment utilizing a certain amount of special purpose functional hardware and controls offers the most practical way of achieving a workable communication link between the individual processors of such a system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of effecting processor to processor communication in a multi-processor computer system including a central memory and a plurality of individual processors serviced thereby, said method comprising:

providing storage space in said central memory for storing message information for each processor, conventionally executing instructions in each processor until a "send message" instruction is detected, determining the recipient processor specified by said "send message" instruction, accessing the central memory at a location which will be regularly accessed by said recipient processor, storing message information at said storage location, and resuming the execution of normal instructions in said sending processor.

2. A method as set forth in claim 1 including each processor periodically accessing the central memory for an indication that a message is contained therein, initiating a message retrieval operation when such an message indication is detected, accessing said message data, executing the message on a predetermined priority basis, and removing the message indication from said central memory.

3. A method as set forth in claim 2 including providing a fixed predetermined storage location in said central memory directly accessible to each processor and periodically accessing said storage location for control information.

4. A method as set forth in claim 3 including inhibiting access in said central memory to any of said predetermined fixed storage locations by a second processor when a first processor is still in the process of accessing said location.

5. In a multi-processor computing system including a central memory and a plurality of individual processors serviced thereby, a storage area in the central memory allocated to each processor, the improvement which comprises:

means in each processor for detecting a "send message" instruction in its instruction stream, means for determining the recipient processor for said message, means for accessing central memory at the storage location allocated for said recipient processor, and means for storing the message identifying data at said storage location.

6. A multi-processing system as set forth in claim 5 including means in each processor for periodically accessing central memory at said allocated storage location means for notifying said processor that a message is present in said central memory, means for accessing said message information on a predetermined priority basis, and means for removing said message indication from said central memory.

7. A multi-processing system as set forth in claim 6 wherein said allocated storage location in said central memory is located in a fixed predetermined address therein, means in each processor for periodically checking said fixed address in central memory allocated to said processor for control information, and means for indicating when said control information comprises a message indication.

8. A multi-processor system as set forth in claim 7 wherein a "lock out" mechanism is provided including means in each processor operable to prevent another processor from accessing one of said storage locations while a previous processor is accessing same.

9. A multi-processing system as set forth in claim 8 wherein each predetermined storage location contains job allocation timer data for its associated processor and means in each processor for altering said timing information in a predetermined fashion to indicate to a recipient processor that message information is also stored in said predetermined storage location.

10. A multi-processing system as set forth in claim 9 including means in each processor for storing the current timing information in a predetermined storage location in said memory in an additional section of memory related thereto, and means for returning said original timing information to its original location subsequent to extracting message data from said central memory.

11. A multi-processor system as set forth in claim 10 including in each predetermined storage location associated with each processor of the system comprises at least four separately addressable words containing (1) locking data to prevent multiple access to said storage location, (2) timing data information, (3) alternate timing data information wherein the original timing information is retained and (4) message identifying information, means in each processor for sequentially accessing and utilizing these storage locations allocated to a "recipient" processor whenever a "send message" instruction is encountered in the instruction stream of a "sending" processor and for periodically accessing at least the Lock and Timer word when no message is present and for accessing all four locations when a message indication is present in said timer location.

12. In a multi-processor computing system including a central memory and a plurality of individual processors serviced thereby, a multi-word storage location in the central memory allocated to each processor, each said storage location comprising at least four separately addressable words containing (1) locking data to prevent multiple access to said storage location, (2) timing data information, (3) alternate timing data information wherein original timing information may be retained and (4) message identifying information, means in each processor for detecting a "send message" instruction in its instruction stream, means for determining the recipient processor for said message, means for accessing central memory at the multi-word storage location allocated for said recipient processor, means for specifically determining if the storage location is locked, means for locking said storage location, means for examining the timer word for an indication of a message stored therein, means for transferring the timer word to the alternate timer word, means for storing message information in the timer word and the message word, means for unlocking the storage location, means in each processor for periodically accessing central memory at its own allocated storage location including means for specifically determining if the storage location is locked, means for locking said storage location, means for examining the timer word to determine if a message is present, means for accessing a message word and utilizing the message data to obtain suitable message instructions, means for transferring the alternate timer word back into the timer word, means for unlocking the storage location, and means for executing the message instruction on a predetermined priority basis.

13. A multi-processing system as set forth in claim 12 wherein said means for storing message information in said timer word includes means for storing all zeros in said timer word, and said means for determining if a message is present includes means for checking for all zeros stored therein.

14. A multi-processing system as set forth in claim 13 including means in a sending processor operative upon a determination that a message is already present in the allocated storage location of a recipient process to check its own instruction register to determine if the message already present is to be overwritten.

References Cited

UNITED STATES PATENTS

| | | |
|---|---|---|
| Re. 26,171 | 3/1967 | Falkoff. |
| 3,346,851 | 10/1967 | Thornton et al. |
| 3,363,234 | 1/1968 | Erickson et al. |

GARETH D. SHAW, Primary Examiner